US010652435B2

(12) United States Patent
Gill et al.

(10) Patent No.: US 10,652,435 B2
(45) Date of Patent: May 12, 2020

(54) METHODS AND SYSTEMS FOR REDUCING IMAGE ARTIFACTS

(71) Applicant: Rambus Inc., Sunnyvale, CA (US)

(72) Inventors: Patrick R. Gill, Sunnyvale, CA (US); Thomas Vogelsang, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 186 days.

(21) Appl. No.: 15/714,483

(22) Filed: Sep. 25, 2017

(65) Prior Publication Data
US 2018/0091705 A1 Mar. 29, 2018

Related U.S. Application Data

(60) Provisional application No. 62/436,538, filed on Dec. 20, 2016, provisional application No. 62/399,620, filed on Sep. 26, 2016.

(51) Int. Cl.
*H04N 5/217* (2011.01)
*G02B 5/18* (2006.01)
*G02B 27/00* (2006.01)
*G02B 27/42* (2006.01)

(52) U.S. Cl.
CPC ......... *H04N 5/2173* (2013.01); *G02B 5/1842* (2013.01); *G02B 27/0056* (2013.01); *G02B 27/0068* (2013.01); *G02B 27/4205* (2013.01)

(58) Field of Classification Search
CPC .. H04N 5/2173; H04N 5/2251; G02B 5/1842; G02B 27/0068; G02B 27/4205; G02B 27/0056; G02B 5/1871; G03H 1/041; G03H 1/0443; G03H 1/0244; G03H 2223/13; H01L 27/14625
USPC ........................................................ 348/241
See application file for complete search history.

(56) References Cited

U.S. PATENT DOCUMENTS

| | | | | |
|---|---|---|---|---|
| 4,360,797 A * | 11/1982 | Fenimore | ................ | G01T 1/295 250/363.06 |
| 5,113,286 A * | 5/1992 | Morrison | ............. | G02B 5/1857 359/569 |
| 6,525,875 B1 * | 2/2003 | Lauer | ................... | G03H 1/0443 359/368 |
| 7,767,950 B2 * | 8/2010 | Perlman | ................. | H04N 5/357 250/208.1 |
| 8,369,642 B2 * | 2/2013 | Findlay | ................... | G06T 5/003 358/3.26 |

(Continued)

OTHER PUBLICATIONS

David G. Stork and Patrick R. Gill, Lensless Ultra-Miniature CMOS Computational Imagers and Sensors, presented at Sensorcomm 2013: The Seventh International Conference of Sensor Technologies and Applications, Aug. 2013 (5 pp.).

*Primary Examiner* — Pritham D Prabhakher
(74) *Attorney, Agent, or Firm* — Silicon Edge Law Group LLP; Arthur J. Behiel

(57) ABSTRACT

An imaging system with a diffractive optic captures an interference pattern responsive to light from an imaged scene to represent the scene in a spatial-frequency domain. The sampled frequency-domain image data has properties that are determined by the point-spread function of diffractive optic and characteristics of scene. An integrated processor can modified the sampled frequency-domain image data responsive to such properties before transforming the modified frequently-domain image data into the pixel domain.

20 Claims, 2 Drawing Sheets

(56) References Cited

U.S. PATENT DOCUMENTS

| | | | | |
|---|---|---|---|---|
| 8,508,606 B2* | 8/2013 | Liu | ............ | G06T 5/003 |
| | | | | 348/208.4 |
| 8,582,820 B2* | 11/2013 | Kane | ............ | G06T 5/003 |
| | | | | 382/106 |
| 10,178,321 B2* | 1/2019 | Emtman | ............ | G02B 21/367 |
| 10,284,825 B2* | 5/2019 | Endsley | ............ | H04N 5/2256 |
| 2002/0088952 A1* | 7/2002 | Rao | ............ | G01N 21/9501 |
| | | | | 250/559.45 |
| 2010/0008597 A1* | 1/2010 | Findlay | ............ | G06T 5/003 |
| | | | | 382/275 |
| 2011/0026593 A1* | 2/2011 | New | ............ | H03M 7/42 |
| | | | | 375/240.12 |
| 2011/0122296 A1* | 5/2011 | Liu | ............ | G06T 5/003 |
| | | | | 348/241 |
| 2012/0076362 A1* | 3/2012 | Kane | ............ | G06T 5/003 |
| | | | | 382/106 |
| 2014/0253781 A1 | 9/2014 | Gill et al. | | |
| 2015/0373265 A1* | 12/2015 | Gill | ............ | G02B 5/1842 |
| | | | | 348/218.1 |
| 2017/0084046 A1 | 3/2017 | Gill et al. | | |
| 2017/0085846 A1* | 3/2017 | Damberg | ............ | G02B 26/06 |
| 2017/0168285 A1* | 6/2017 | Ozcan | ............ | G02B 21/367 |

* cited by examiner

METHODS AND SYSTEMS FOR REDUCING IMAGE ARTIFACTS

BACKGROUND

Optics can be thought of as performing mathematical operations transforming light intensities from different incident angles to locations on a two-dimensional image sensor. In the case of focusing optics, this transformation is the identity function: each angle is mapped to a distinct corresponding point on an image sensor. When focusing optics are impractical due to size, cost, or material constraints, the right diffractive optic can perform an operation other than the identity function that is nonetheless useful to produce a final image. In such cases the sensed data may bear little or no resemblance to the captured scene; however, a desired digital image can be computed from the sensor outputs.

BRIEF DESCRIPTION OF THE DRAWINGS

The present invention is illustrated by way of example, and not by way of limitation, in the figures of the accompanying drawings and in which like references refer to similar elements and in which.

DETAILED DESCRIPTION

Figure 1:
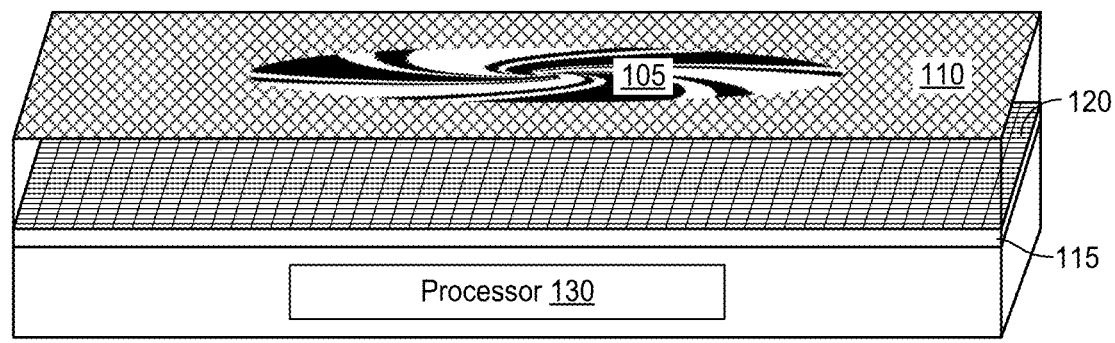
FIG. 1 depicts an imaging system 100 with diffractive optic 105 centered in an opaque aperture layer 110 over a two-dimensional array 115 of photosensitive elements 120.
Figure 1:
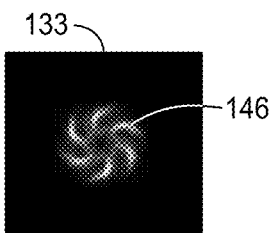
Figure 1:
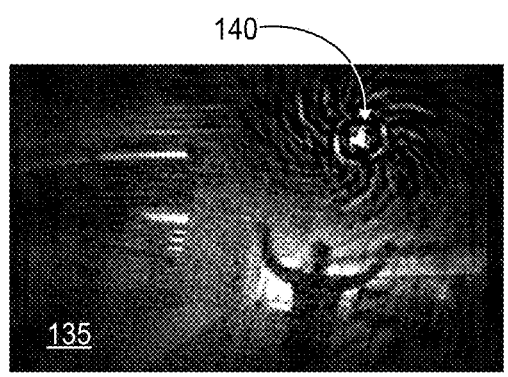
Figure 1:
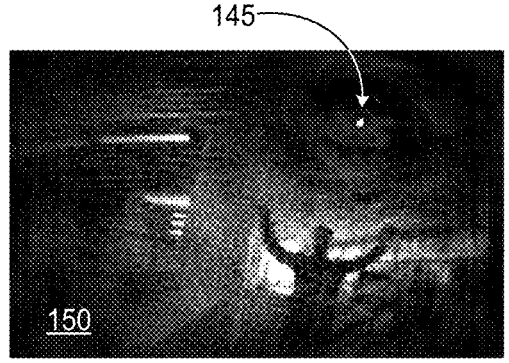

FIG. 1 depicts an imaging system 100 with diffractive optic 105 centered in an opaque aperture layer 110 over a two-dimensional array 115 of photosensitive elements 120. Optic 105, a diffraction grating, performs an optical function on light from a given scene to generate an interference pattern. Array 115 samples this interference pattern to acquire image data representative of the scene in a spatial-frequency domain. A processor 130 integrated with system 100 transforms the sampled frequency-domain image data into a pixel-domain image of the scene. Processor 130 and associated memory can also be provided remotely, or can be distributed between local and remote compute resources.

Diffractive optic 105 exhibits a spiral point-spread function, represented here as a response 133 to a point-source illumination. The spiral point-spread function can produce spiral halo artifacts in the frequency domain. As illustrated by an image 135, transforming sampled frequency-domain image data with a halo artifact into a pixel-domain image of the scene can produce a visually distracting image artifact 140. In this example, a recessed light fixture 145 appears as a bright spot surrounded by radiating curved lines. Imaging system 100 supports processes that address halo artifacts in the frequency domain to produce an image 150 in the pixel domain with a more accurate representation of light fixture 145.

In this example diffractive optic 105 is a phase grating with a pattern of binary features that creates diverging lines of odd symmetry. These features, examples of which are detailed in U.S. Pat. No. 9,110,240 to Patrick R. Gill and David G. Stork, offer considerable insensitivity to the wavelength of incident light over a wavelength band of interest, and also to the manufactured distance between optic 105 and the underlying array of photosensitive elements 120. The patterns also offer sensitivity over a gamut of spatial frequencies. In this disclosure, references to "frequency" relate to "spatial frequency," the level of detail present in image data per degree of visual angle. To avoid confusing spatial and temporal frequencies, the term "wavelength" is used for color.

Diffractive optic 105 is rotationally symmetric and circularly asymmetric, and exhibits a rotationally symmetric and circularly asymmetric point-spread function represented here as response 133. Curved arms 146 radiating away from the center provide a central-cross-sectional intensity profile that is a strong function of cross-sectional angle. Rotationally symmetric and circularly asymmetric two-dimensional shapes include spirals and crosses. Examples of circularly symmetric point-spread responses include blurred spots and Airy patterns.

Figure 2:
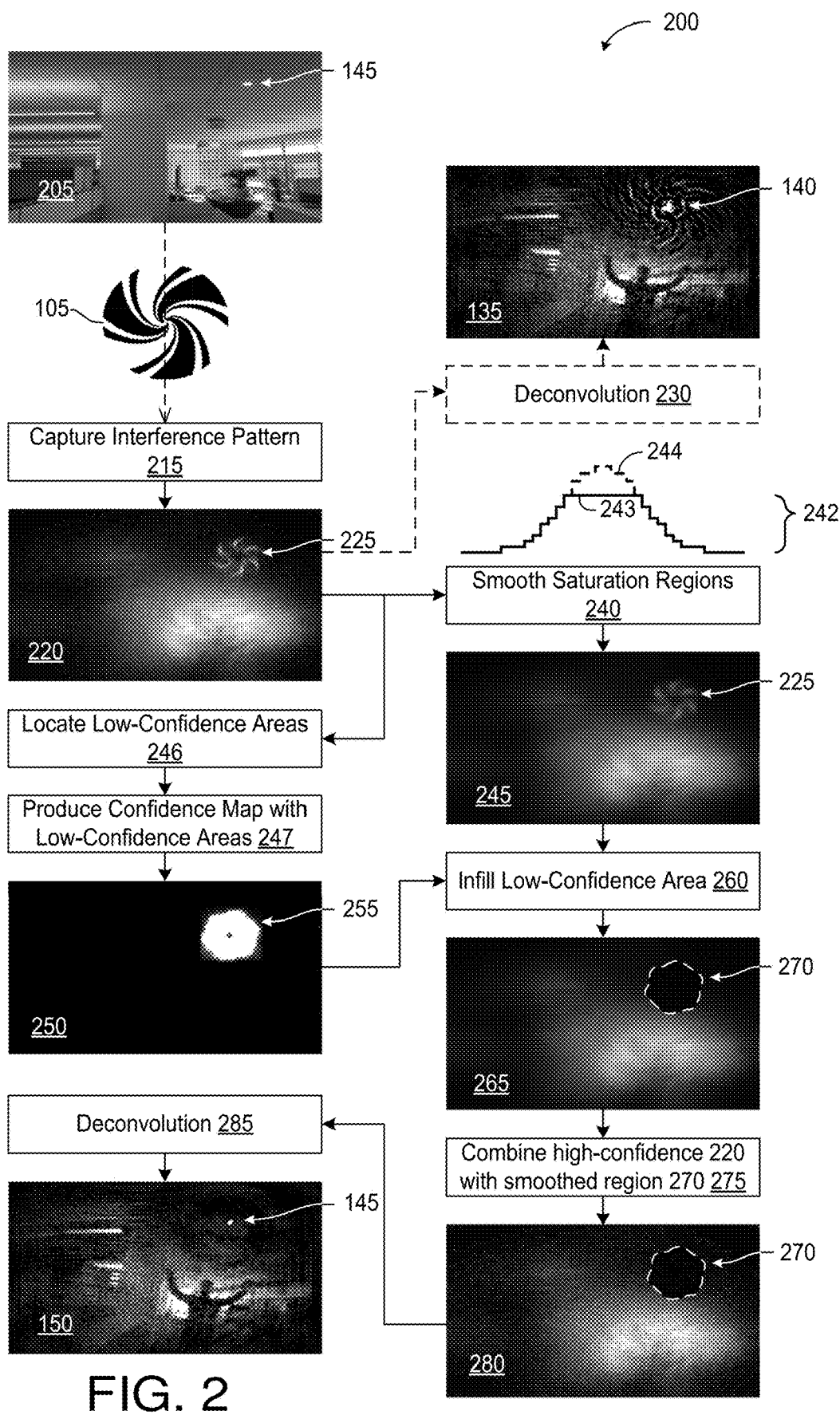
FIG. 2 is a flowchart 200 detailing how an image is captured and resolved using imaging system 100 of FIG. 1.

FIG. 2 is a flowchart 200 detailing how an image is captured and resolved using imaging system 100 of FIG. 1. First, system 100 is oriented such that light from a scene 205 of interest is incident diffractive optic 105. This exemplary scene 205 includes light fixture 145 (FIG. 1) as an example of a bright point source. The incident light passes through diffractive optic 105, which modulates the received light to produce intensity patterns for capture by underlying photodetector array 115 as a raw data set that represents scene 205 in the spatial-frequency domain (215). An image 220 representing the intensity values of the sampled frequency-domain image data of step 215 is unintelligible to a human observer but is a predictable transformation of the incident scene.

The sampled frequency-domain image data has one or more image properties determined by the point-spread function of diffractive optic 105 and characteristics of scene 205. In the instant example, the sampled frequency-domain image data represented by image 220 includes a halo artifact 225 of a shape determined by the point-spread function of diffractive optic 105 and the light from fixture 145 and areas of saturations that can be associated with or outside of halo artifact 225.

The sampled frequency-domain image data can be deconvolved using e.g. Fourier deconvolution to construct image 135 of scene 205 in the pixel domain using the point-spread function for optic 105, possibly in combination with the underlying array (230). The "pixel domain" refers to the digital representation of an image with respect to pixels, the smallest addressable element of an image. The reader may notice a person with raised arms in image 135 that was not part of scene 205. The sampled scene was of the same room but with the person posed beneath light fixture 145.

The point-spread function of imaging system 100 is known from e.g. a prior calibration or high-fidelity simulation. In practice, however, the actual point-spread function of the imaging system may not precisely match that of the known function. Such differences can be due to e.g. color mismatch, increased incident angle, sub-element shifts, or saturation. Halo artifact 225 may therefore differ from the expected response of system 100 to the light from fixture 145. Differences between the calibrated point-spread response and the actual, field-observed point-spread response cause deconvolution 230 to produce a pixel-domain image 135 with a considerable point-source artifact 140 in lieu of a bright spot.

Imaging system 100 supports image processing that reduces the impact of differences between the calibrated point-spread response and the actual point-spread response. Processor 130 identifies and smooths saturation regions in the raw data set represented as pattern 220 (240). Saturation regions are areas in which the photosensitive elements 120 reached their maximum measurement value. An illustrative intensity cross section 242 includes a saturation region 243. System 100 can extrapolate intensity values 244 in the raw image data based on the slope of values surrounding region 243 and knowledge of response 133. The result is a smoothed data set represented here by a pattern 245. Artifact 225 is still evident in pattern 245.

Setting aside pattern 245 for the moment, processor 130 also processes the raw image data represented by pattern 220 to locate low-confidence areas (246) in the data. This process can be performed by deconvolving the raw data set at full or at reduced resolution, with or without smoothed saturation regions, and applying a threshold to the result of the deconvolution yielding one or more suprathreshold deconvolution regions. This technique allows processor 130 to disregard relatively dim samples that are unlikely to cause image artifacts. Performing this deconvolution at low resolution saves time and power, producing a lower resolution version of image 135 with a corresponding suprathreshold scene object (not shown) in the region of artifact 140. Processor 130 identifies each roughly circular suprathreshold scene object as an area of low confidence. The center of each of these areas is located and presumed to represent the location of a point source. In the instant example, process 246 notes the location of the point source associated with artifact 140.

Next, in step 247, processor 130 produces a confidence map 250 by positioning a thickened point-source response 255 centered on the center of the identified point source. In this example dark (light) areas of confidence map 250 represent high (low) confidence pixel values. An imaged point source is expected to exhibit spiral features like that of response 225; however, the features of point-source response 255 are thickened to cover the expected range of point-source distortions. Point-source response 255 represents the region to be censored, and can be formed by e.g. convolving a point response with a spot of a diameter chosen to provide a desired tolerance.

Next, in step 260, smoothed pattern 245 is multiplied by confidence map 250 and the low-confidence values of point-source response 255 filled using a smooth interpolation of surrounding higher-confidence samples (260). In one embodiment, for example, processor 130 takes a weighted average of sample values surrounding thickened point-source response 255, wherein the weights are proportional to the confidence in the data. The values in the low-confidence areas of response 255 are then replaced with a weighted mixture of the original sample values from pattern 220 and the confidence-weighted average of nearby high-confidence samples from pattern 245. The weighting reflects the confidence in the original samples: relatively high-confidence original samples are mostly preserved, low-confidence samples are mostly replaced by an average of nearby high-confidence samples, and the transition between preservation and replacement is smoothed. The resultant modified frequency-domain image data is shown here as an interference pattern 265 with low-confidence area 270 filled in. In other embodiments samples in the low-confidence areas are modified or replaced differently, such as by combining or replacing the samples with values from a reference frame or, for video embodiments, from a different video frame.

Processor 130 combines the in-filled low-confidence area 270 with the high-confidence regions of the image data represented by pattern 220 (step 275) to produce a hybrid interference pattern 280. The image data represented by interference pattern 280 is then transformed using e.g. Fourier deconvolution (285) to recover image 150. Processor 130 inserts a point source that represents light fixture 145, its location having been determined in step 230. The properties of this point source (e.g. size, intensity, and color) can be derived from the values provided by artifact 225. Imaging system 100 can thus produce a still image or video frame of scene 205 with reduced point-source artifacts due to light fixture 145.

In other embodiments, hybrid interference pattern 280 can be processed to form a sensing measurement other than to generate an image, for instance to sense movement among less-bright objects surrounding the point source. More generally, generating hybrid interference pattern 280 prior to subsequent analysis can be helpful in any application where the bright point source itself is a potential distractor and could deleteriously interfere with the objective of measuring some quantity related to objects in the scene other than the point source.

While the subject matter has been described in connection with specific embodiments, other embodiments are also envisioned. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A method for imaging a scene, the method comprising:
    modulating light from the scene using a diffractive optic to produce an interference pattern;
    sampling the interference pattern to acquire sampled frequency-domain image data representing the scene;
    modifying the sampled frequency-domain image data responsive to an image property of the sampled frequency-domain image data to produce modified frequency-domain data; and
    after modifying the sampled frequency-domain image data, transforming the modified frequency-domain image data into a pixel-domain image of the scene.

2. The method of claim 1, wherein the image property represents an aspect of the scene.

3. The method of claim 2, wherein the image property comprises a saturation region.

4. The method of claim 3, wherein the saturation region corresponds to a point source in the scene.

5. The method of claim 1, wherein the image property represents a low-confidence area.

6. A method for imaging a scene, the method comprising:
    modulating light from the scene using a diffractive optic to produce an interference pattern;
    sampling the interference pattern to acquire sampled frequency-domain image data representing the scene; and
    modifying the sampled frequency-domain image data responsive to an image property of the sampled frequency-domain image data;
    wherein the image property represents a low-confidence area; and
    wherein modifying the sampled frequency-domain image data responsive to the image property comprises in-filling the low-confidence area to produce the modified frequency-domain image data.

7. The method of claim 6, wherein the sampled frequency-domain image data comprises intensity values, the method further comprising assigning confidence values to the intensity values.

8. The method of claim 7, wherein the in-filling comprises:
weighting the intensity values within and around the low-confidence area in proportion to their confidence values; and
combining the weighted intensity values within the low-confidence area with the weighted intensity values around the low-confidence area.

9. The method of claim 6, wherein the diffractive optic exhibits a point-spread function, and wherein in-filling the low-confidence area comprises applying a correction pattern that is a function of the point-spread function to the sampled frequency-domain image data.

10. The method of claim 9, wherein the diffractive optic exhibits a rotationally symmetric and circularly asymmetric point-spread function.

11. The method of claim 9, wherein the low-confidence area represents a point response with a central-cross-sectional intensity profile that is a strong function of cross-sectional angle.

12. The method of claim 11, wherein the point response includes features that radiate away from a center of the response in a plane of the interference pattern.

13. The method of claim 12, wherein the features are curved.

14. The method of claim 6, wherein locating the low-confidence area comprises deconvolving the sampled frequency-domain image data, applying a threshold to a result of a deconvolution yielding a suprathreshold deconvolution region, and grouping the suprathreshold deconvolution region into a suprathreshold scene object.

15. The method of claim 14, wherein locating the low-confidence area further comprises determining whether the suprathreshold scene object represents a circular image artifact.

16. A method for imaging a scene, the method comprising:
modulating light from the scene using a diffractive optic to produce an interference pattern;
sampling the interference pattern to acquire sampled frequency-domain image data representing the scene;
modifying the sampled frequency-domain image data responsive to an image property of the sampled frequency-domain image data; and
identifying a saturation region in the sampled frequency-domain image data and extrapolating intensity values within the saturation region.

17. The method of claim 16, wherein the identifying the saturation region in the sampled frequency-domain image data and the extrapolating intensity values within the saturation region are based on intensity values outside the saturation region.

18. An imaging system comprising:
a diffractive optic to produce an interference pattern representing an imaged scene in a spatial-frequency domain;
an array of photosensitive elements to sample the interference pattern as sampled frequency-domain image data representing the scene; and
a processor to modify the sampled frequency-domain image data responsive to an image property of the sampled frequency-domain image data;
wherein the diffractive optic exhibits a point-spread function, and wherein the processor applies a correction pattern that is a function of the point-spread function to the sampled frequency-domain image data; and
wherein the diffractive optic exhibits a rotationally symmetric and circularly asymmetric point-spread function.

19. A method for imaging a scene, the method comprising:
modulating light from the scene using a diffractive optic to produce an interference pattern;
sampling the interference pattern to acquire sampled frequency-domain image data representing the scene;
modifying the sampled frequency-domain image data responsive to an image property of the sampled frequency-domain image data to produce modified frequency-domain data; and
after modifying the sampled frequency-domain image data, processing the modified frequency-domain image data to form a sensing measurement.

20. The method of claim 19, the sensing measurement to sense movement.

* * * * *